Oct. 31, 1933.    J. G. MAXWELL ET AL    1,933,442
ROTARY MOTOR
Filed Nov. 10, 1931    4 Sheets-Sheet 1

Joseph G. Maxwell,
Arthur J. Maxwell, INVENTORS

BY Victor J. Evans & Co.
ATTORNEY

Oct. 31, 1933. J. G. MAXWELL ET AL 1,933,442
ROTARY MOTOR
Filed Nov. 10, 1931  4 Sheets-Sheet 2
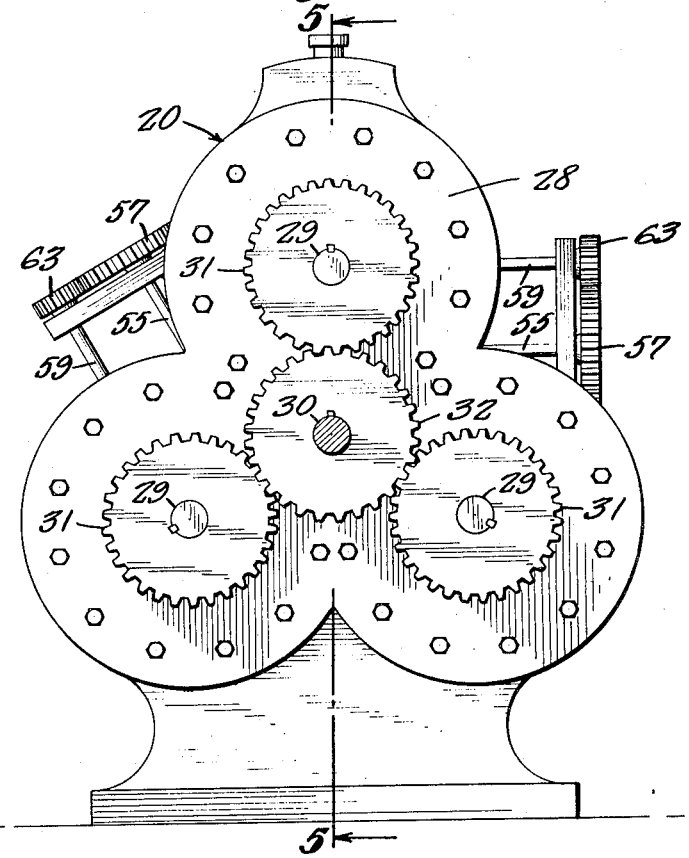
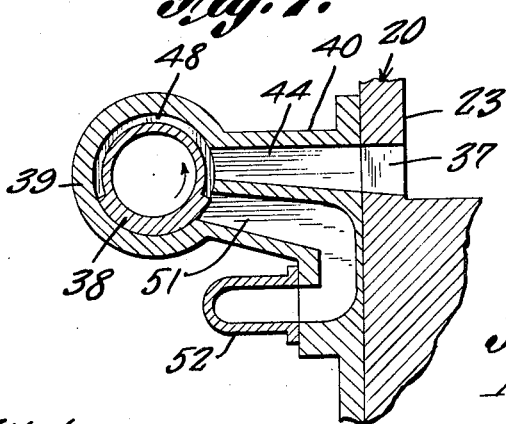
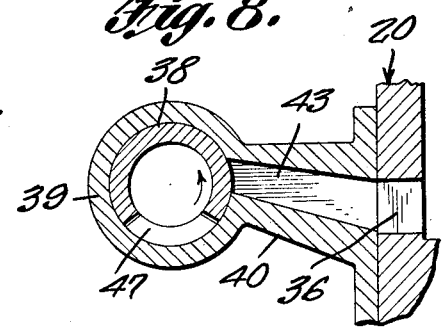
Joseph G. Maxwell,
Arthur J. Maxwell,
INVENTORS
BY Victor J. Evans & Co.
ATTORNEY
WITNESS:

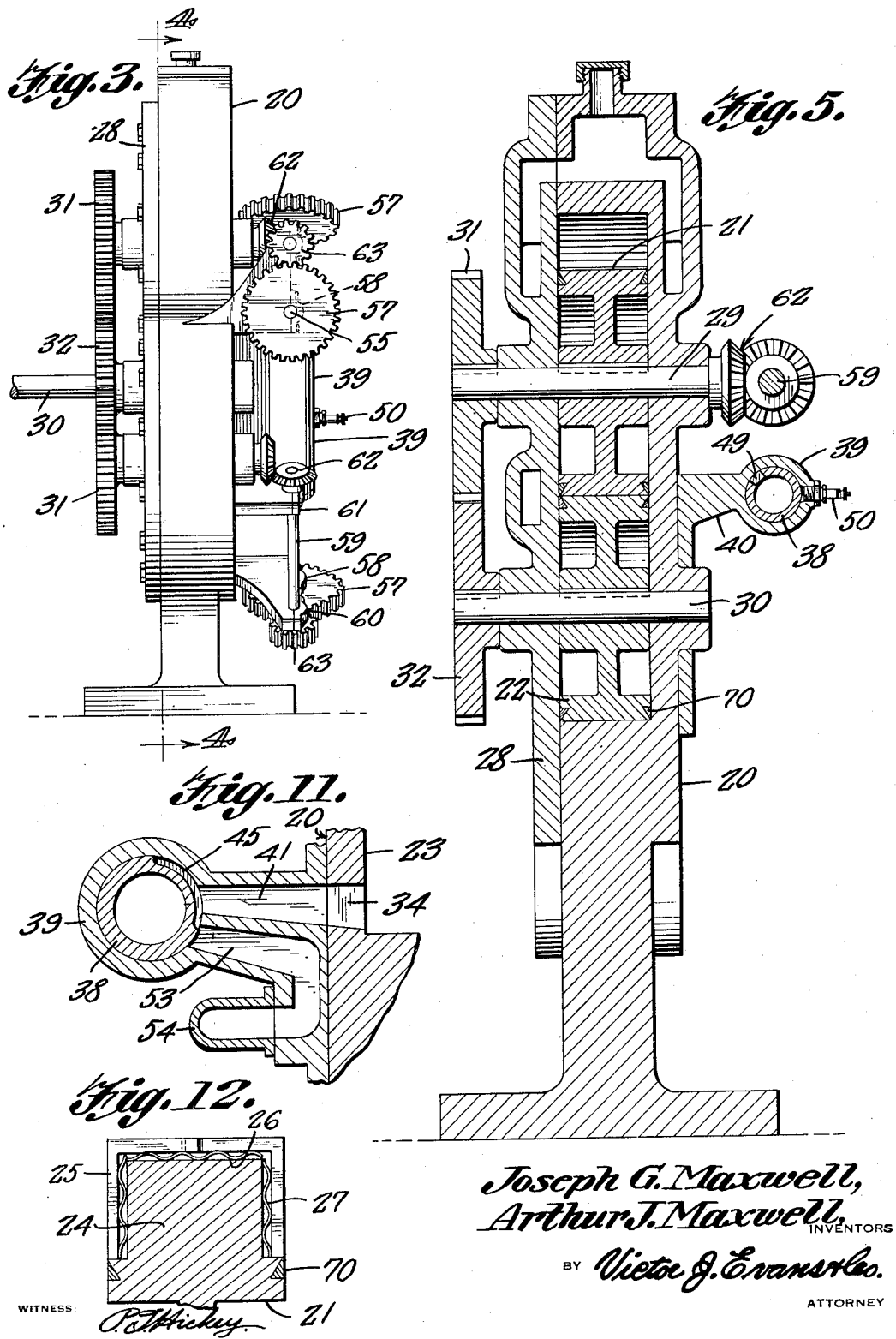

Oct. 31, 1933.   J. G. MAXWELL ET AL   1,933,442
ROTARY MOTOR
Filed Nov. 10, 1931   4 Sheets-Sheet 4

Joseph G. Maxwell,
Arthur J. Maxwell,
INVENTORS

BY Victor J. Evans & Co.
ATTORNEY

WITNESS:

Patented Oct. 31, 1933

1,933,442

UNITED STATES PATENT OFFICE 1,933,442

ROTARY MOTOR

Joseph G. Maxwell and Arthur J. Maxwell, Newcomerstown, Ohio, assignors of eleven-twentieths to Henry B. Kistler, Newcomerstown, Ohio Application November 10, 1931
Serial No. 574,215

4 Claims. (Cl. 60—44)

The object of the invention is to provide a combustion motor of the rotary type provided with a plurality of rotors so coordinated that the output of the driving shaft will be substantially continuous, as contra-distinguished from motors of the more or less intermittent type as respects the power output of the shaft; to provide a rotary motor operating on three revolutions to accomplish the four steps of the cycle, so that perfect compression of the charge may be secured prior to firing; and to provide a motor of the type indicated which is generally of simple form and, therefore, susceptible for cheap manufacture.

With this object in view the invention consists in a construction and combination of parts of which a preferred embodiment is illustrated in the accompanying drawings but to which embodiment the invention is not to be restricted further than is imposed by the appended claims.

In the drawings:

Figure 2 is a front elevational view.

Figure 3 is a side elevational view.

Figure 5 is a sectional view on the plane indicated by the line 5—5 of Figure 2.

Figure 1:
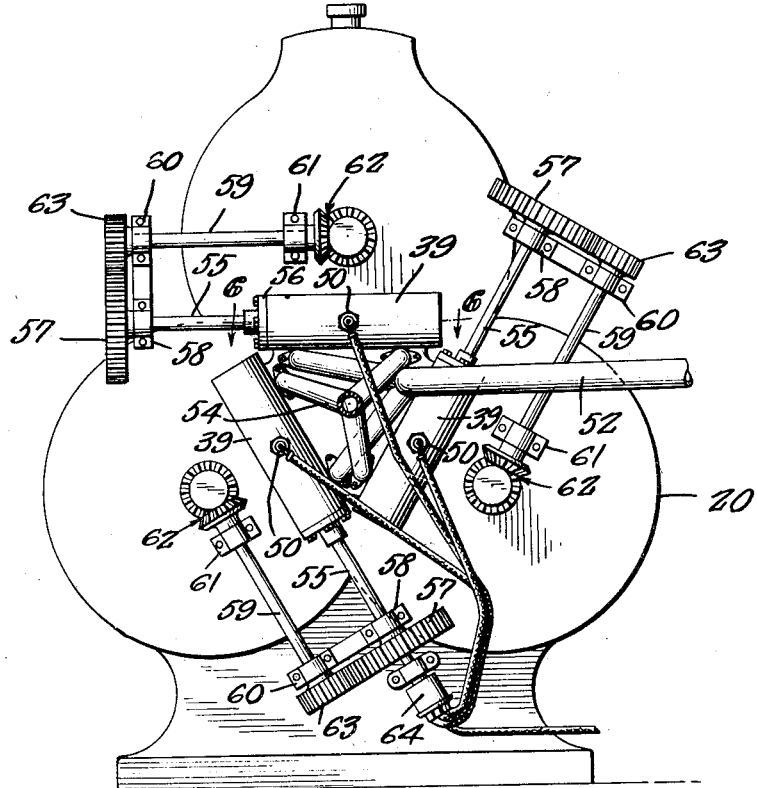
Figure 1 is a rear elevational view of a motor constructed in accordance with the invention.
Figure 6:
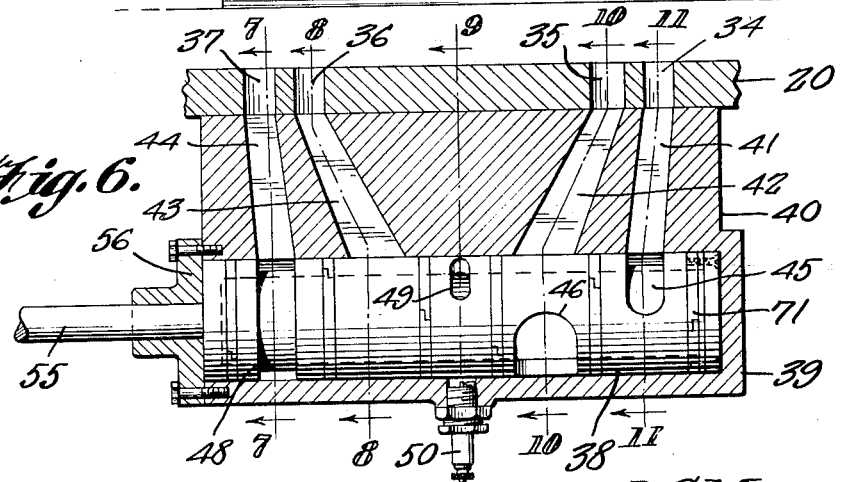
Figure 6 is a sectional view on the plane indicated by the line 6—6 of Figure 1.

Figures 7, 8, 9, 10 and 11 are sectional views on the planes indicated by the line 7—7, 8—8, 9—9, 10—10 and 11—11, respectively of Figure 6.

Figure 4:
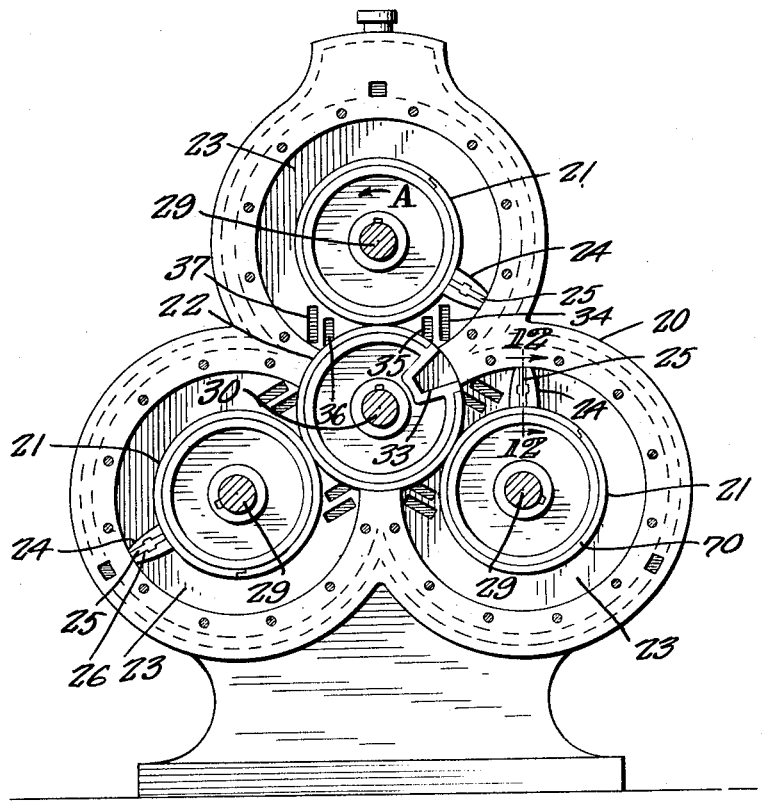
Figure 4 is a sectional view on the plane indicated by the line 4—4 of Figure 3.
Figure 9:
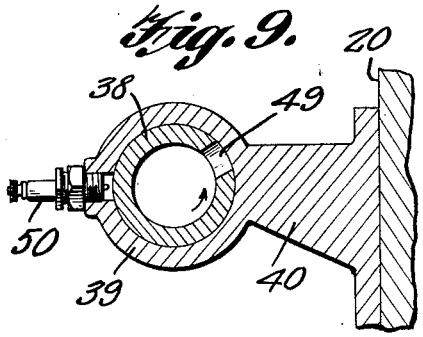
Figure 10:
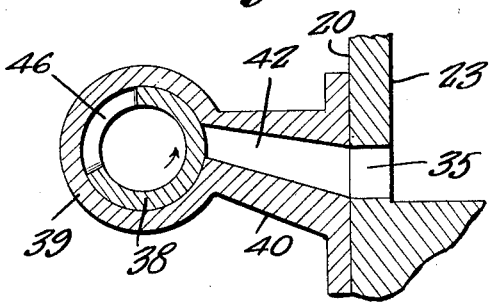

Figure 12 is a sectional view on the plane indicated by the line 12—12 of Figure 4.

Mounted in a trifoliate case 20 are the power rotors 21 and the idler rotor 22, each in its appointed chamber, of which the power chambers 23 are of greater diameter than the chamber housing the idler rotor by reason of the fact that each power rotor is provided with a pressure or driving head 24 consisting of a substantially radially disposed blade which is in edge contact with the peripheral and side walls of the power chamber by means of its attendant packing strip 25. The packing strip is seated in a groove 26 extending around the side edges and front edge of the pressure head. A sinuous spring 27 is seated in the bottom of the groove and tends to force the packing strip outwardly.

The case 20 is closed by an integral rear wall on one side and by a removable cover plate 28 on the other side and the shafts 29 carrying the power rotors, as well as the shaft 30 which carries the idler rotor are journaled in appropriate bearings formed in the side wall and cover plate.

In order that the power rotors may run in complete coordination they are operatively connected by means of the gears 31 mounted on the shafts 29 and mesh with a gear 32 mounted on the shaft 30. The rotors are so positioned that the power or pressure heads 24 have an angular lead one over the other. This agular displacement is preferably 120° so that in any position of one pressure head, that of another power rotor follows at a distance of 120° and the third 120° behind that. In the event that the number of power chambers be increased above the illustrated number of three, the angular displacement of the pressure heads will be based on the number of chambers employed. The rotors 21 are in peripheral contact with the rotor 22 and the latter is formed with a recess 33 cut inwardly from its periphery. The idler rotor is so disposed on its shaft that the recess registers with the pressure head of any power rotor when the pressure head passes the idler rotor, the pressure head entering the recess 33.

The integral rear wall of the case 20 is provided with four ports in the region of each power chamber 23 and adjacent the peripheral line of travel of the idler rotor 22. These ports are indicated at 34, 35, 36 and 37 in Figures 4 and 6. The ports of each power chamber are controlled with a cylindrical valve 38 rotatably mounted in a cylindrical chamber 39 supported by a bracket 40 and secured to the rear wall of the case and provided with ducts 41, 42, 43 and 44 which in the case contacting side of the bracket register with the ports 34, 35, 36 and 37. The valve 38 is hollow and is formed with a slot 45 passing through the cylindrical wall and extending a specified angular distance around the valve, this slot registering with the duct 41. Similarly, the valve 38 is formed with a slot 46 angularly displaced with reference to the slot 45 but registering with the duct 42. Further it is formed with a similar slot 47 angularly displaced with reference to the slots 45 and 46 but registering with the duct 43. The valve is also formed with a short slot 49 which extends through the cylinder wall. This slot is also angularly displaced with reference to the slots 45, 46 and 47 so that when the slot 46 is in register with the duct 42 it (the slot 49) may be directly below the electrode of the spark plug 50 which is mounted in the peripheral wall of the cylindrical casing 39 at an intermediate point in the length of the valve 38.

A channel 48 which does not extend through the wall of the valve 38 is formed in the latter to register with the duct 44, this channel being of a comparatively great angular extent since it provides for scavenging the exhaust gases when in register with the duct 44 and duct 51 which is also formed in the bracket 40 directly below the duct 44. The exhaust manifold 52 connects with the bracket at the outlet of the ducts 51.

The duct 41 constitutes the intake duct for a charge and, therefore, this duct is disposed directly above a duct 53 formed in the bracket 40 and communicating at its intake end with an intake manifold 54.

In order to provide for the intake, compression firing and scavenging of the charge the angular speed of the valve 38 must be one-third of that of its attendant rotor since the motor operates on principle of three revolutions to accomplish the four steps of the cycle. Therefore, the valve 38 is provided with a shaft 55 extending through a removable head 56 closing its cylindrical casing 39. The remote end of this shaft 55 carries a gear 57 just outside of the bearing 58 in which the shaft 55 is journaled. A shaft 59 parallels the shaft 58 being journaled in the bearings 60 and 61, the latter on the rear wall of the casing 20 and the former on a common bracket with the bearing 58 which bracket is also supported from the rear wall of the case 20. The shaft 59 runs at the same angular speed of its attendant power rotor by reason of the connection between the two consisting of a bevel gear coupling 62 but the shaft 55 runs one-third of the angular speed of the shaft 59 because the gear 63 which is mounted on the shaft 55 is one-third of the diameter of the gear 57 on shaft 55 with which it is in mesh.

In order to provide for energizing the spark plugs 50 in successive order and at the proper time a distributor 64 is provided, this being mounted on the casing 20 and driven by one of the shafts 55. Since the distributor must work in synchronism with the valve the plan for driving it from one of the shafts 55 provides for its most economical means of operation.

In operation, the valve and rotors being so timed, when the pressure head 24 passes the port 34, running in the direction of the arrow A in Figure 4, a charge is drawn in after it, as the slot 45 will be in register with the duct 41, as will the duct 53 which communicates with the intake manifold 54. When the slot 45 shall have passed away from the duct 41, as it will do as a result of rotation of the rotor 21, the intake will be cut off but the recess 48, being at this time in register with the duct 44 the dissipated charge ahead of the pressure head will be driven out through the duct 44 and duct 51 into the exhaust manifold 52. When the rotor 21 shall have made a revolution, its next revolution will be to compress the charge previously taken in, so that then the slot 47 is in register with the duct 43 and the charge being then ahead of the pressure head is compressed in the cylindrical valve 38. The next revolution of the rotor 21 constitutes the power cycle. When the pressure head shall have passed the port 36 after compression the port 36 will be in register with the duct 46 and the slot 49 in register with the spark plug which at this time is energized by the distributor. The charge is thus exploded and expands behind the pressure head of the rotor by reason of passing into the power chamber through the duct 42 and port 35. On the next revolution, the force of the charge will have been dissipated and it will be exhausted through the duct 44, a new charge at the same time being taken in behind the pressure head and through the duct 41, the slots 45 and recess 48, at this time in register with the ducts 41 and 44 to provide for the scavenging of one charge and the intake of another.

Lateral packing rings 70 are provided on the idler and power rotor to prevent leakage at the sides, while packing rings 71 are provided on the valve 38 at the ends of the latter and between the slots 45, 46, 49, 47 and channel 48 to prevent leakage between the different slots and channel and at the ends of the valve.

The invention having been described what is claimed as being useful is:

1. A rotary motor comprising a casing defining a chamber, a power rotor mounted in said chamber and provided with a radially disposed pressure head, intake and exhaust manifolds, a cylindrical housing mounted on the casing and in communication with the intake and exhaust manifolds, the casing being provided with a plurality of ports effecting communication between the chamber and said cylindrical housing, a cylindrical valve mounted in the said cylindrical housing and formed with a hollow interior and spaced slots cut through its wall to said hollow interior, said slots being successively registerable one each with one of said ports, said valve being formed with superficial slots registerable one each with each of the remaining ports and with the intake and exhaust manifolds respectively, means for rotating the valve in timed relation with the rotor, whereby an explosive charge is drawn in behind the pressure head and compressed in the cylindrical valve on the first two revolutions of the rotor, and means for igniting the compressed charge at the beginning of the next revolution of the rotor.

2. A rotary motor comprising a casing defining a chamber, a power rotor mounted in said chamber and provided with a radially disposed pressure head, intake and exhaust manifolds, a cylindrical housing mounted on the casing and in communication with the intake and exhaust manifolds, the casing being provided with a plurality of ports effecting communication between the chamber and said cylindrical housing, a cylindrical valve mounted in the said cylindrical housing and formed with a hollow interior and spaced slots cut through its wall to said hollow interior, said slots being successively registerable one each with one of said ports, said valve being formed with superficial slots registerable one each with each of the remaining ports and with the intake and exhaust manifolds respectively, means for rotating the valve in timed relation with the rotor, whereby an explosive charge is drawn in behind the pressure head and compressed in the cylindrical valve on the first two revolutions of the rotor, and means for igniting the compressed charge at the beginning of the next revolution of the rotor, the valve rotating means consisting of driving connections between the rotor and valve involving a three to one gear couple to reduce the angular speed of the valve to one-third of that of the rotor.

3. A rotary motor comprising a casing defining a chamber, a power rotor mounted in said chamber and provided with a radially disposed pressure head, intake and exhaust manifolds, a cylindrical housing mounted on the casing and in communication with the intake and exhaust manifolds, the casing being provided with a plurality of ports effecting communication between the chamber and said cylindrical housing, a cylindrical valve mounted in the said cylindrical housing and formed with a hollow interior and spaced slots cut through its wall to said hollow interior, said slots being successively registerable one each with one of said ports, said valve being formed with superficial slots registerable one each with each of the remaining ports and with the intake and exhaust manifolds respectively, means for rotating the valve in timed relation with the rotor, whereby an explosive charge is drawn in behind the pressure head and compressed in the cylindrical valve on the first two revolutions of the rotor, and a spark plug mounted in the wall of the cylindrical housing, the cylindrical valve having a slot extending through the wall thereof and registering with the spark plug when one of the other of the slots through the wall of said valve is in registration with its respective chamber port.

4. A rotary motor comprising a casing defining a chamber, a power rotor mounted in said chamber and provided with a radially disposed pressure head, intake and exhaust manifolds, a cylindrical housing mounted on the casing and in communication with the intake and exhaust manifolds, the casing being provided with a plurality of ports effecting communication between the chamber and said cylindrical housing, a cylindrical valve mounted in the said cylindrical housing and formed with a hollow interior and spaced slots cut through its wall to said hollow interior, said slots being successively registerable one each with one of said ports, said valve being formed with superficial slots registerable one each with each of the remaining ports and with the intake and exhaust manifolds respectively, means for rotating the valve in timed relation with the rotor, whereby an explosive charge is drawn in behind the pressure head and compressed in the cylindrical valve on the first two revolutions of the rotor, and a spark plug mounted in the wall of the cylindrical housing, the cylindrical valve having a slot extending through the wall thereof and registering with the spark plug when one of the other of the slots through the wall of said valve is in registration with its respective chamber port, the valve rotating means consisting of driving connections between the rotor and valve involving a three to one gear couple to reduce the angular speed of the valve to one-third of that of the rotor.

JOSEPH G. MAXWELL.
ARTHUR J. MAXWELL.